United States Patent

[11] 3,590,727

[72] Inventor Thomas S. Shevlin
    Bear Lake, Minn.
[21] Appl. No. 738,431
[22] Filed June 20, 1968
[45] Patented July 6, 1971
[73] Assignee Minnesota Mining and Manufacturing Company
    St. Paul, Minn.

[54] RECONSTITUTED FOOD DEVICE AND SYSTEM
    2 Claims, 3 Drawing Figs.
[52] U.S. Cl. ............................................... 99/359,
                                                    219/432
[51] Int. Cl. ............................................. A23l 3/00
[50] Field of Search........................................ 99/359,
    361, 367, 370, 371; 219/432, 433, 385, 386, 387,
                                                    403

[56] References Cited
    UNITED STATES PATENTS
1,582,290  4/1926  Marchesseault.............. 219/432
2,078,650  4/1937  Clark............................ 219/433
3,440,404  4/1969  Prescott....................... 219/432

Primary Examiner—R. Jenkins
Attorney—Kinney, Alexander, Sell, Steldt and Delahunt ABSTRACT: A device and system especially useful for reconstituting foods from a frozen state to an edible state in a period of about 15 minutes is disclosed. The system incorporates a unitized food preparation device comprising an outer thermally insulated shell provided with electrical connection means, an array of shelves having electrical connecting means for mating engagement with the electrical connection means of the shell and with the electrical connecting means of a plurality of individual meal-sized serving casseroles provided with integral, i.e., sandwiched, embedded or bonded, resistance heating elements. In utilizing the device, meal-sized portions of food are packed in each casserole, in which the food is then precooked and/or frozen for storage and distribution. In the reconstitution process, the food is heated or cooked by the integral heating elements of the individual casseroles.

INVENTOR.
THOMAS S. SHEVLIN
BY Kinney, Alexander,
Sell, Steldt & DeLaHunt
ATTORNEYS

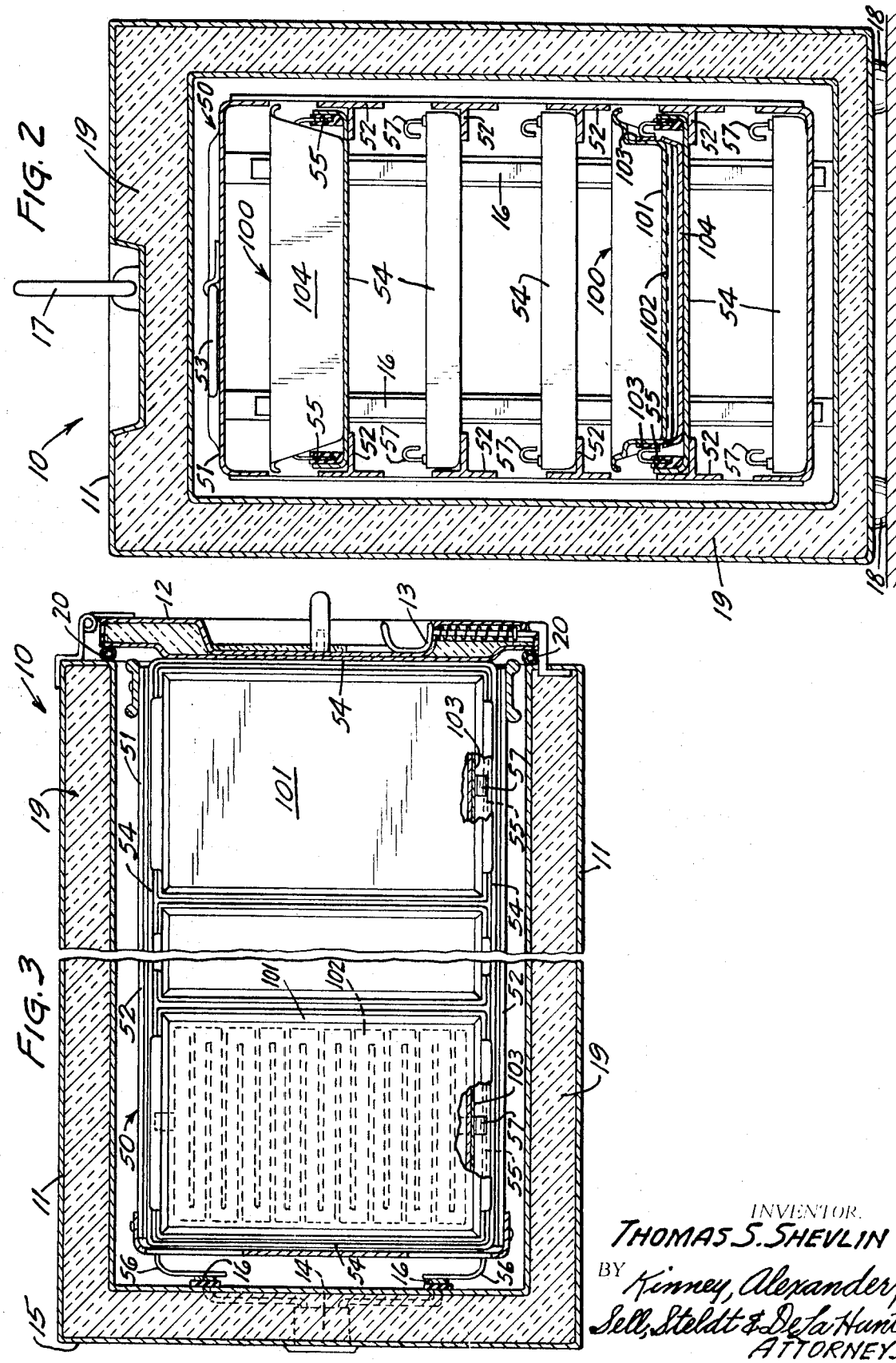

RECONSTITUTED FOOD DEVICE AND SYSTEM

The present invention relates to a device and system for handling and reconstituting food packed in individual portions, the food portions being reconstituted to a serving state within a relatively short period of time. Reconstituting as used herein refers to the application of heat to cook and/or heat foods to edible condition after fresh or precooked food has been frozen, chilled, retained in semiheated state or otherwise treated to prevent spoilage.

The device comprises a unitized food preparation apparatus which is particularly suited for use where a large number of meals must be served in a relative short time, e.g., banquets, restaurants, catering services, and the like. The devices of the present invention are particularly useful in aircraft and similar conveyances where weight considerations are extremely important and available equipment and food preparation time are limited.

The effort, and attendant public relations programs, devoted to the quality and diversity of food served by the airline industry is legendary. In order to prepare and serve such meals within the alloted time, especially on short flights of less than one and one-half hours duration, the air travel industry has devised systems for completely cooking meals in advance and merely keeping or "holding" the prepared food hot aboard the aircraft.

It has also devised systems for partially precooking the meals in advance at ground stations. The precooked foods are then placed aboard the aircraft in heated state and cooking is completed during flight. These systems, however, could not conveniently be utilized to prepare such items as steaks-to-order. With the advent of the more exotic and exacting specialty and gourmet foods as standard items on airline menus, the previously quite successful food preparation systems are being found entirely inadequate to the task. Certain of these foods, because of their delicate nature, cannot be precooked and "held" at serving temperatures for any length of time. Accordingly, if these foods are to be served aboard aircraft, some method of rapid yet exacting in-flight reconstitution or other heat treatment of food must be provided. Ideally, such an in-flight cooking system must be capable of processing individual meal-sized portions from a frozen state to a serving temperature (about 180° F.) within the range of 5 to 20 minutes.

The present invention provides a system and device that is compatible with present day large scale food preparation methods, particularly foods that have been subjected to some form of precooking and subsequent freezing, chilling or "hold" heating. For example, the invention is adaptable for handling foods that must be precooked and retained for comparatively short periods of time in either a chilled or a semiheated condition. The invention is also adaptable for cooking fresh foods or fresh foods that have been placed in frozen state.

The system and device is particularly adaptable for reconstituting cryogenically frozen foods packed and prepared in individual meal-sized portions. Meal-sized portions are placed in individual casseroles for precooking or similar kitchen treatment and then placed in a frozen state or otherwise treated to prevent spoilage. The food in the individual casseroles may then be stored at a central location and subsequently distributed to distant points in a frozen or other preserved state for eventual reconstituting and serving without removal from the casseroles. Because of the nature of the integral heating unit incorporated in each casserole, the food may be reconstituted from frozen to serving state in very short periods of time.

The reconstitution of individually packaged meal-sized food portions is accomplished by means of a unitized food preparation device comprising an outer thermally insulated shell provided with electrical contacts, an array of shelves to support a pan member, each of the pan members provided with electrical contacts, and a plurality of individual meal-sized casserole dishes having an electrical resistance heating element embedded in or bonded thereto and terminating in electrical contacts for engagement with corresponding contacts on the pan members. The outer thermally insulated shell is connected to an appropriate power source through a control console which in turn energizes the individual pan members on the shelf array when the corresponding electrical contacts are coupled. Power is then transferred to the individual casserole dishes through appropriate contacts after the dishes have been inserted in the pan members.

The device can be modified to cook or reconstitute a single or a small number of meals by eliminating the outer shell and shelves and connecting the electrical contacts of a modified pan member directly to a power source to energize the individual casseroles. One or a small number of casseroles are then inserted into the pan member and power applied for reconstituting or cooking a limited number of meals.

An object of the present invention is the provision of a food preparation device which can process food from a frozen state to serving temperature within a period of time as short as 5 minutes.

Another object of the present invention is to provide a device which can be carefully and closely time or temperature-controlled so that delicate foods can be processed therein.

A further object is the provision of a unitized food preparation device having interchangeable components.

A still further object is to provide a unitized food preparation device incorporating individual dishes or casseroles each having an integral heating element, the casseroles adaptable to a system for packing individual or multiple meal-sized food portions in the casseroles, precooking, freezing, or otherwise preserving and distributing the food in the casseroles and reconstituting or cooking the food by means of the integral heating element in each casserole.

These and other objects and advantages will become apparent to those skilled in the art from the following detailed description and disclosure, especially in light of the accompanying drawings, wherein like numerals refer to corresponding parts in the several diagrammatic views, in which:

FIG. 2 is an end elevational view, partly in section, of the device of FIG. 1 and of the integrally heated individual casserole of the present invention;

FIG. 3 is a plan view, partly in section and with a portion broken away, of the device of FIGS. 1 and 2 and of the integrally heated individual casserole of the present invention.

Figure 1:
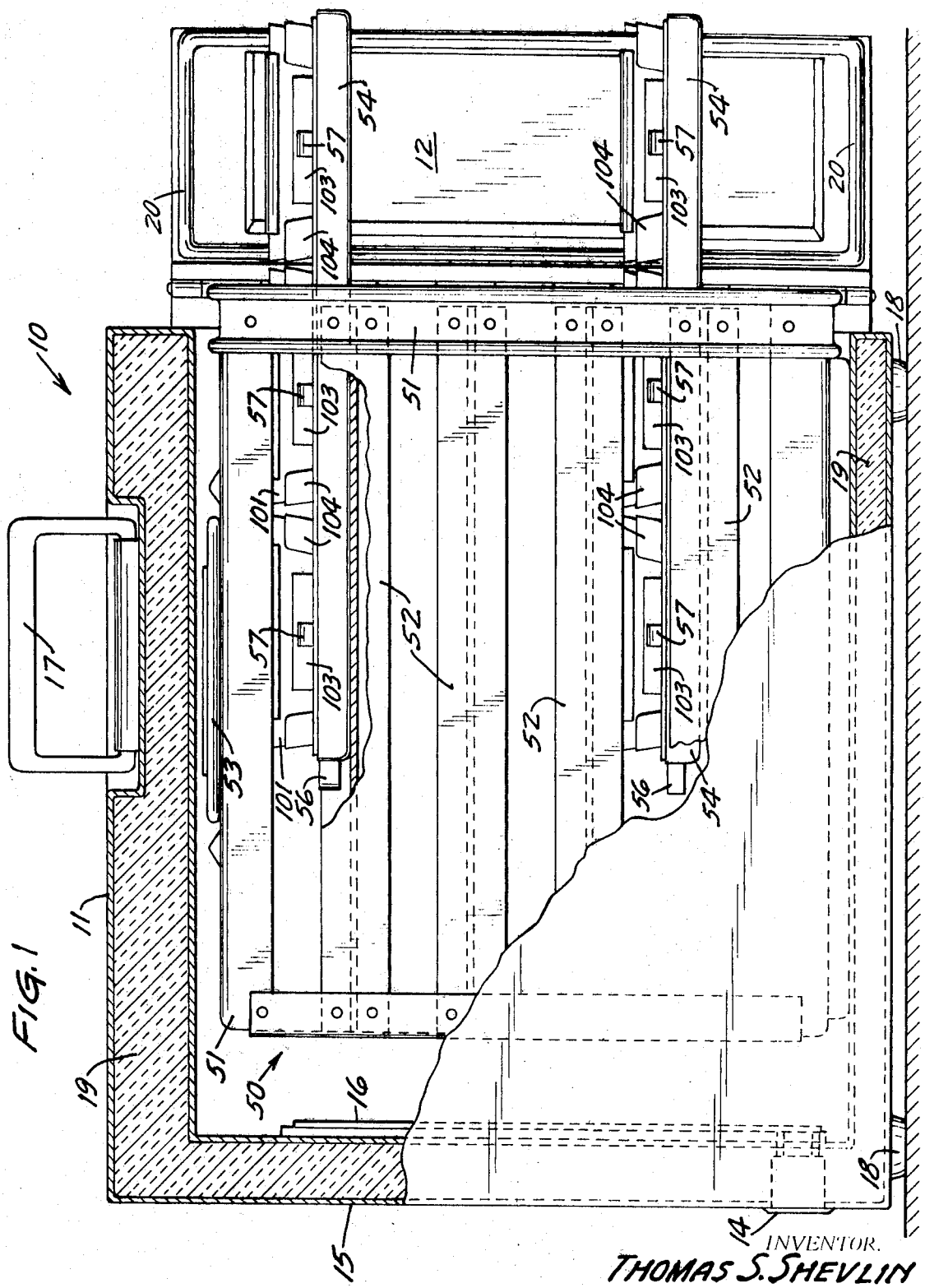
FIG. 1 is a side elevational view, partly in section, of the unitized food preparation device of the present invention.

The embodiment of the unitized food preparation device shown in the drawings and described below is adapted primarily for use in aircraft. However, it is to be understood that modifications of the device and the method it provides for utilizing the casseroles to package, store and reconstitute precooked foods may be used by others who prepare or distribute reconstituted foods such as restaurants, catering services and the like.

Referring now to the drawings, the unitized food preparation device 10 is seen to comprise an outer thermally insulated shell 11, an array of shelves 50 and individual casseroles 100.

The thermally insulated shell 11 comprises a cabinet provided with a reasonably close fitting door 12 with a closure mechanism 13 of convention design. Door 12 is also provided with a gasket (not shown) about its periphery so that a substantially moisture tight environment is provided upon closing of the door, thus minimizing dehydration of the food during the processing cycle. It is, or course, contemplated that the closure means may be a magnetic gasket such as conventionally utilized for refrigerators and the like. The configuration of door 12 is such that it will exert pressure upon shelf array 50 when the door is closed in normal use (see FIG. 3).

A suitable electrical connector 14 for mating contact with a wall-mounted electrical connector (not shown) is fitted into the rear wall 15 of shell 11. Bus bars 16, mounted within shell 11 and suitably insulated, are in turn connected to connector 14.

Shell 11 is provided with a self-storing carrying handle 17 for portability and easy removal for maintenance purposes. It is also provided with a plurality of leveling feet 18. Thermal insulation material 19, such as glass wool, expanded polystyrene, etc., is packed between the inner and outer walls of shell 11 to maintain the food in its frozen state until the application of heat and to minimize heat loss during operation. If desired, refrigeration means can be incorporated within shell 11 to maintain foodstuffs placed in the shell in refrigerated state until reconstitution.

Shelf array 50 comprises a rack 51 of generally open construction. Struts 52 are regularly spaced in pairs in the interior of rack 51 to define a plurality of shelf supports. Although struts 52 are shown to be generally T-shaped in cross section, any suitable configuration which will serve as shelf supports may be used—in fact, shelf supports formed of sheet material may be utilized although such shelf supports would contribute greatly to the weight of the rack. Rack 51 is also provided with a self-storing carrying handle 53 for portability.

Shelf array 50 also comprises a plurality of shallow pan members 54 which slidably fit within rack 51 and accommodate a plurality of integrally heated individual casseroles 100. Pan members 54 are each provided with bus bars 55 which are suitably insulated from pan member 54. Bus bars 55 terminate at their free ends as spring contacts 56 which protrude beyond the end of the pan to make contact with bus bars 16 when door 12 is secured. C-shaped spring biased cantilevered contacts 57 are spaced over the length of bus bars 55 in pan members 54 and positioned so as to mate with the contacts on the individual casseroles 100 for making electrical contact therewith.

It is to be understood that shelf array 50 may be constructed of a large variety of materials and can be variously configured. For example, rack 51 may be completely eliminated by placing struts 52 directly into the interior of shell 11. Alternatively, rack 51 could be provided with bus bars 55, thus eliminating the need for pan members 54. An open "pan" structure with recesses for the individual casseroles was constructed of heavy gage wire stock and was found to perform quite satisfactorily. A pair of parallel insulated pivotable bus bars, bent at right angles at their inner free ends, are centrally positioned along each longitudinal edge of the structure and arranged so that mating engagement of the right angularly bent portion of the bus bars with helically slotted contact members mounted on bus bars 16 will result in pivoting of the bus bars into contact with the contact tabs of the individual casseroles carried by the "pan" structure.

It is to be further understood that shelf array 50, rack 51, and shell 11 may be entirely eliminated and a device for heating individual or a limited number of casseroles can be devised by simply utilizing the pan members 54 to support and supply electrical energy to each casserole. In such device, but bars 55 are eliminated and a suitable power cord with an appropriate switch is connected directly to spring biased contacts 57. Pan 54 is suitably fashioned to be supported by a flat surface and to hold one or more casseroles. As can be visualized from viewing FIG. 2, a pair of biased contacts 57 may be disposed on opposite sides of pan 54 for supplying electrical energy to the heating element of each casserole after the latter is properly inserted into the pan. In utilizing this modification, servings for one or a limited number of individuals can be prepared by packing and precooking a meal-sized portion of food in each casserole and properly treating it to prevent spoilage, such as subjecting it to flash freezing. Subsequently, the casserole with the frozen food is placed in pan member 54 for reconstitution. Conversely, fresh foods or fresh frozen foods may be taken from a refrigerator or freezer and packed into the casserole for immediate heating and cooking after the casserole is placed in pan member 54. Thus the device can be used by anyone desiring to prepare individual meals such as small restaurants, cooking meals in the home, etc.

Turning to the casserole per se, each casserole 100 comprises a body member 101 which can be fabricated of a large variety of materials such as ceramic, glass, high temperature plastics or metal. A typical casserole is one stamped out of mild steel, substantially in the desired shape, to which various coating layers are applied by relatively well-known porcelain enamel techniques. Thus, an enamel coat which is tough, acid and alkali resistant, and which may have a variety of colors, decorative or informational designs as an integral part thereof can be applied to the interior of the casserole. The outer surface, especially the relatively flat bottom surface, is preferably coated with a layer having high insulating, high dielectric strength properties, especially at elevated temperatures. An electrical resistance heater 102 is applied over the insulating layer. In the preferred embodiment, resistance element 102 comprises a thick film resistor, but a thick metallic wire ribbon, such as nichrome, may also be used. Resistence element 102 is preferably designed so that casserole 100 has a heat rating of about 10—15 watts per square inch of resistorized surface area. The ends of electrical resistance element 102 are brought out to opposed edges of the casserole and are terminated in contact tabs 103. Contact tabs 103 are located so that positive electrical connection with the opposed C-shaped spring contacts 57 is made by inserting casserole 100 into pan member 54. Resistance element 102 may be electrically and mechanically protected by coating with a further layer of vitreous material. Additional layers providing further heat reflecting, heat insulating and mechanical protection properties may be added. In the embodiment illustrated, a stamped metal cover 104 is fitted over and bonded about its periphery to body member 101, as by welding or other suitable means to provide insulation and mechanical protection to resistance element 102. It is obviously possible to fabricate cover 104 of a large variety of materials.

In operation, the device may be used in a number of ways by airlines, restaurants, caterers, and others desiring to prepare a large number of meals on a quick service basis.

The device is particularly useful and affords an economical method of handling and reconstituting precooked foods to be served in a large volume of meals. For example, in airline usage, a number of thermally insulated shells 11, each having a capacity, of e.g., 15 casseroles, would be mounted in the galley of an aircraft and electrically connected to a suitable power source through a control panel. Shells 11 receive the casseroles 100 individually packed with meal-sized portions of food, the food being previously precooked and cryogenically frozen for storage and distribution in the casseroles. Each casserole may be provided with a suitable cover (not shown) after precooking for protection of the food during storage and distribution. The casseroles 100 are placed in pan members 54 where contact tabs 103 engage cantilevered spring contacts 57 thereby making firm mechanical and electrical contact therewith; spring contacts 57, because they are cantilevered, exert reasonable force against contact tabs 103 to secure the casseroles against dislodgement due to mechanical shock. Pan members 54 containing casseroles 100 are then loaded into racks 51 in readiness for loading aboard an aircraft. In preloading state, the racks and casseroles are exposed to a refrigerated environment for maintaining the food in the casseroles in frozen condition. Racks 51 can then be brought aboard the aircraft, as needed, and simply inserted into shells 11, thus engaging spring contacts 56 with bus bars 16 located within shell 11. Electrical energy is supplied to individual casseroles 100 by properly setting the control panel. Electrical energy is preferably supplied in a thermostatically controlled or time controlled manner. A similar serving system can be used by restaurants and caterers, the loaded racks placed in shells 11 for final heating and/or cooking at the serving point.

The device completely eliminates the necessity for reconstituting food a short period of time after precooking. The period of time that elapses between precooking and reconstitution is no longer an important factor. Inasmuch as a time factor is eliminated, precooking or other advance preparation may now be undertaken at a central location convenient to the overall operation. Individual meals can be packaged in casseroles 100 and while in the casserole, precooked in conventional manner and cryogenically frozen for storage at a central facility. The casseroles, with their contents in frozen state, may then be stored and subsequently shipped to distribution centers where they are placed in pan members 54 and loaded onto racks 51 for placement aboard aircraft or delivery to restaurants and caterers. The user may then prepare a great volume of meals in a time range of 5—15 minutes by energizing the integral heating element of each casserole after they have been placed in shells 11.

The device is also compatible with present methods of handling precooked and frozen foods. Precooked foods may be packed into each casserole before or after initial cooking and treated to prevent spoilage by chilling and subsequently reheating in the casserole for serving. Conversely, precooked food may be held in heated state by placing the casseroles in shell 11 while the food is in a semiheated condition shortly after cooking. After placing in the shell, the food is reheated in desired periods of time to serving temperatures. The device, of course, may also be used for the entire cooking operation by placing individual portions of fresh or frozen uncooked foods into the casseroles and heating them when in shell 11 to cooking and serving temperatures.

If individual or a small number of meals are to be prepared, fresh or precooked foods may be packed in the casseroles and maintained in a frozen state until the casseroles are placed in the individual pan members 54 for heating or cooking. Additionally, fresh or frozen foods may be maintained in a refrigerator or freezer and packed into the casserole at the start of the cooking or reheating operation.

The device can be used to prepare large food portions. Casseroles 100, pans 54 and shells 11 can be enlarged to desired sizes in order to prepare multiple servings in each casserole. A plurality of meals or a large serving of a particular food; such as meats, vegetables, soups, entrees, etc., can be reconstituted, reheated to edible temperatures, or cooked from a frozen or fresh state in the enlarged casseroles after they have been placed in pans 54. After reconstitution, reheating, or cooking, individual food portions are suitably transferred or spooned to conventional serving dishes.

In operating the present unitized food preparation device, several inherent advantages are to be noted. There are no moving parts in the device and the interior of shell 11 has no protrusions and is therefore easy to clean and maintain. No built-in resistance elements are utilized in the shell thereby eliminating regions of intense heat or the chance of scorching the interior of the shell. Thus the device is safe to operate and provides an appropriate environment for reconstituting delicate foods. Also, such built-in resistance elements tend to age prematurely and can otherwise contribute to early failure of the system. The uniform heating provided by heating each individual casserole 100 allows elimination of air circulating fans, thus further contributing toward reduced maintenance expenses. Casseroles 100 are designed to have a low heat capacity and consequently they heat essentially immediately in response to electrical power input and rapidly conduct the heat to the foodstuffs contained therein. This rapid heat transfer results in rapid passage of the food through bacterially sensitive temperature zones during warming or reconstitution cycles.

A further advantage is that the heating elements 102 of the individual casseroles 100 can be formed with various resistances so that a group of meals requiring different degrees of heat can be simultaneously reconstituted after the casseroles are placed in shell 11. For example, food that requires heat produced from 200 watts of power may be placed in one series of casseroles having heating elements with the required level of resistence to produce such heat. Other foods requiring heat produced from 170 watts of power may be placed in another series of casseroles having heating elements with a different level of resistance compatible with the heating requirements of the other food. The heating elements of the casseroles can be tailor-made to meet the particular heating requirement of different kinds of foods. Additionally, an individual casserole may be produced with a heating element 102 having a nonuniform resistance over the resistorized area to provide varying gradients of temperature over the area. A food composition requiring various degrees of heat for cooking or reconstituting the composition may then be packed into the casserole over the appropriate resistorized area.

Another operational advantage offered by the unitized food preparation device of the present invention resides in the fact that any number of casseroles 100 may be placed within shell 11 and individually heated, thereby achieving a great economy in electrical power when only a small fraction of the total capacity of said shell is used. Similarly, because of the small mass and because of the superior heat transfer characteristics achieved by having the heat source intimately associated with each casserole, generated heat being delivered immediately to the food, lower overall temperatures may be utilized to achieve the same degree of heating or cooking thereby avoiding significant dehydration of food products.

The specific embodiments herein are given by way of example, and the invention is limited only by the terms of the following claims.

What I claim:

1. A unitized food preparation device comprising; an outer thermally insulated shell having electrical connection means, an array of shelves having electrical connecting means for engagement with the electrical connection means of said shell, a plurality of individual casseroles having integral resistance heating elements terminating in electrical connecting means adapted for engagement with the electrical connecting means of said array and means for transmitting electrical energy to said food preparation device.

2. A food preparation device comprising; a thermally insulated shell; one or a plurality of slidable pan members disposed in said shell; electrical connecting means associated with each slidable pan member connectable to a source of electric energy; one or a plurality of individual casseroles removably disposed in said pan members; and electrical heating elements associated with each individual casserole, the elements terminating in contact tabs for engagement with said electrical connecting means to connect the elements to said source of electrical energy.